US008705643B2

(12) United States Patent
Sathananthan et al.

(10) Patent No.: US 8,705,643 B2
(45) Date of Patent: Apr. 22, 2014

(54) CHANNEL ESTIMATION FOR A CONTROL CHANNEL IN AN OFDM SYSTEM

(75) Inventors: Kanagaratnam Sathananthan, Victoria (AU); Phong Nguyen, Victoria (AU); Huei-Ming Lin, Victoria (AU)

(73) Assignee: NEC Corporation, Tokyo (JP)

( * ) Notice: Subject to any disclaimer, the term of this patent is extended or adjusted under 35 U.S.C. 154(b) by 67 days.

(21) Appl. No.: 13/254,292

(22) PCT Filed: Mar. 31, 2010

(86) PCT No.: PCT/JP2010/056272
§ 371 (c)(1),
(2), (4) Date: Oct. 27, 2011

(87) PCT Pub. No.: WO2010/114167
PCT Pub. Date: Oct. 7, 2010

(65) Prior Publication Data
US 2012/0033751 A1 Feb. 9, 2012

(30) Foreign Application Priority Data

Apr. 1, 2009 (AU) ................. 2009901411

(51) Int. Cl.
*H04L 27/28* (2006.01)
(52) U.S. Cl.
USPC ........................................... 375/260; 455/59
(58) Field of Classification Search
USPC ....................................................... 375/260
See application file for complete search history.

(56) References Cited

U.S. PATENT DOCUMENTS

| 6,959,052 | B2 | 10/2005 | Harada et al. |
| 8,287,456 | B2 | 10/2012 | Daigle |
| 2003/0231662 | A1* | 12/2003 | Klingenbrunn et al. ...... 370/536 |
| 2004/0253962 | A1* | 12/2004 | Ganti et al. ................ 455/452.1 |
| 2008/0232488 | A1 | 9/2008 | Sandell et al. |
| 2009/0103666 | A1* | 4/2009 | Zhao et al. ..................... 375/341 |
| 2009/0122853 | A1* | 5/2009 | Lopez de Victoria ......... 375/232 |
| 2009/0285315 | A1* | 11/2009 | Wu ................................ 375/260 |
| 2010/0074346 | A1* | 3/2010 | Thompson et al. ............ 375/260 |
| 2010/0197241 | A1* | 8/2010 | Aedudodla et al. ........ 455/67.13 |
| 2011/0200126 | A1* | 8/2011 | Bontu et al. ................... 375/260 |
| 2012/0057872 | A1* | 3/2012 | Freda et al. ...................... 398/76 |
| 2013/0190622 | A1 | 7/2013 | Daigle |

FOREIGN PATENT DOCUMENTS

CN 1334659 2/2002
(Continued)

OTHER PUBLICATIONS

International Search Report, PCT/JP2010/056272, Jun. 1, 2010.
(Continued)

*Primary Examiner* — Chieh M Fan
*Assistant Examiner* — Santiago Garcia
(74) *Attorney, Agent, or Firm* — Young & Thompson

(57) ABSTRACT

A method of channel estimation for a control channel in an OFDM system of the present invention includes the steps of: performing weighted averaging over time of input LS estimates of a plurality of channel condition matrices; performing frequency domain averaging on the input LS estimates; performing channel estimates on multiple subcarriers of pilot OFDM symbols from the frequency domain averaged input LS estimates; and performing channel estimates on multiple subcarriers of OFDM symbols in the control channel from the channel estimates on the subcarriers of pilot OFDM symbols.

14 Claims, 5 Drawing Sheets

(56) References Cited

FOREIGN PATENT DOCUMENTS

| | | |
|---|---|---|
| CN | 1780277 | 5/2006 |
| CN | 101079863 | 11/2007 |
| CN | 101203183 | 6/2008 |
| JP | 2002-271293 | 9/2002 |
| JP | 2007-251342 | 9/2007 |
| JP | 2008-118411 | 5/2008 |
| JP | 2008-206053 | 9/2008 |
| JP | 2008-211786 | 9/2008 |
| JP | 2008-312186 | 12/2008 |
| JP | 2009-016924 | 1/2009 |
| WO | WO 2009/017083 | 2/2009 |

OTHER PUBLICATIONS

CN Office Action dated Aug. 21, 2013, with English translation; Application No. 201080014222.9.
Japanese Official Action—2011-541015—Jan. 14, 2014.

* cited by examiner

CHANNEL ESTIMATION FOR A CONTROL CHANNEL IN AN OFDM SYSTEM

TECHNICAL FIELD

The present invention relates generally to orthogonal frequency division modulation (OFDM) communication systems, and in particular to channel estimation of a control channel in such an OFDM system.

Priority is claimed on Australian Provisional Patent Application No. 2009901411, filed Apr. 1, 2009, the content of which is incorporated herein by reference.

BACKGROUND ART

OFDM communication systems are becoming widely applied in wireless communication systems due to the high rate transmission capability with high bandwidth efficiency and robustness with regard to multi-path fading and delay. A fundamental underlying principle of OFDM systems is the division of available frequency spectrum into several sub carriers. To obtain a high spectral efficiency, the frequency responses of the subcarriers are overlapping and orthogonal. This orthogonality can be completely maintained with a small price in a loss in signal to noise ratio, even though the signal passes through a time dispersive fading channel, by introducing a cyclic prefix.

A block diagram of a baseband OFDM system is shown in FIG. 1. Binary information is firstly grouped, coded and mapped according to the modulation in a signal mapper 10. After a guard band is inserted by guard band insertion block 12, an N-point inverse discrete-time Fourier transform (IDFT) block 14 transforms the data sequence into the time domain. Following the IDFT block 14, a cyclic prefix is inserted by cyclic prefix insertion block 16 to avoid intersymbol and intercarrier interference. A D/A converter 18 transforms the digitized signal into an analogue form for transmission across a channel. The channel 20 is modeled as an impulse response g(t) followed by the complex additive white Gaussian noise n(t).

At a receiver 22, after passing through an analogue-to-digital (A/D) converter 24 and removing the cyclic prefix at cyclic prefix deletion block 26, a Discrete Time Fourier Transform (DFT) block 28 is used to transform the data back into the frequency domain. After guard band deletion by the guard band deletion block 30, the binary information data is finally obtained back after demodulation and channel decoding by the channel decoding and demodulation block 32.

Such an OFDM system is equivalent to a transmission of data over a set of parallel channels. As a result, the fading channel of an OFDM system can be viewed as a 2D lattice in a time-frequency plane, which is sampled at pilot positions. The channel characteristics between pilots are estimated by interpolation.

One exemplary channel estimation scheme used in OFDM systems is depicted in FIG. 2. In this example, OFDM channel estimation symbols are periodically transmitted, and all subcarriers are used as pilots. The receiver 22 acts to estimate the channel conditions (specified by channel coordination matrix) given the pilot signals (specified by pilot signal matrix X) and received signals (specified by received signal matrix $\overline{Y}$). The receiver 22 uses the estimated channel conditions to decode the received data inside the block until the next pilot symbol arrives. The estimation can be based on least square (LS), minimum mean-square error (MMSE), and modified MMSE.

An LS estimator minimizes the parameter $(\overline{Y}-X\overline{H})^H(\overline{Y}-X\overline{H})$, where $(\cdot)^H$ means the conjugate transpose operation. It is shown that the LS estimator of the matrix $\overline{H}$ is given by:

$$\hat{H}_{LS} = \underline{X}^{-1}\overline{Y} = [(X_k/Y_k)]_T (k=0, \ldots, N-1)$$

However, these estimates are frequently found to be not accurate enough to decode transmitted information, particularly when a received signal strength is poor and/or during highly varying channel conditions. There currently exists a need to provide an improved method of channel estimation for a control channel in an OFDM system which takes into account one or more of the channel conditions in time and frequency, and the quality of the received signal to improve performance, whilst keeping the complexity and processing delays low. There also exists a need to provide a method of channel estimation for a control channel in an OFDM system that ameliorates or overcomes one or more disadvantages or inconveniences of known channel estimation methods.

DISCLOSURE OF INVENTION

With this in mind, one aspect of the present invention provides a method of channel estimation for a control channel in an OFDM system, the method including the steps of: performing weighted averaging over time of input LS estimates of a plurality of channel condition matrices; performing frequency domain averaging on the input LS estimates; performing channel estimates on multiple subcarriers of pilot OFDM symbols from the frequency domain averaged input LS estimates; and performing channel estimates on multiple subcarriers of OFDM symbols in the control channel from the channel estimates on the subcarriers of pilot OFDM symbols.

Preferably, the frequency domain averaging is carried out using a frequency domain averaging window having a length and/or coefficients determined by the frequency slope from the input LS estimates.

In this case, the method may, in one or more embodiments, further include the steps of: comparing the frequency slope to one or more thresholds; determining the estimated frequency selectivity of the control channel; and using the estimated frequency selectivity to determine the frequency domain averaging window length and/or coefficients.

The channel estimates on all subcarriers of pilot OFDM symbols may be performed by linear interpolations/extrapolation or by LMMSE interpolation. Conveniently, the interpolation may be implemented by matrix multiplication.

The channel estimates on all subcarriers of OFDM symbols in the control channel may be performed by assigning control channel OFDM symbol channel estimates to all other control channel OFDM symbol channel estimates.

Alternatively, the channel estimates on all subcarriers of OFDM symbols in the control channel may be performed by using linear interpolation/extrapolation with previous control channel OFDM symbol channel estimates.

Another aspect of the invention provides a communications device which performs channel estimation for a control channel in an OFDM system. The device including one or more data processing blocks for: performing weighted averaging over time of input LS estimates of a plurality of channel condition matrices; performing frequency domain averaging on the input LS estimates; performing channel estimates on multiple subcarriers of pilot OFDM symbols from the frequency domain averaged input LS estimates; and performing channel estimates on multiple subcarriers of OFDM symbols in the control channel from the channel estimates on the subcarriers of pilot OFDM symbols.

BRIEF DESCRIPTION OF THE DRAWINGS

Various aspects and features of the invention will be more fully understood with reference to the drawings in which.

EXEMPLARY EMBODIMENT FOR CARRYING OUT THE INVENTION

Figure 1:
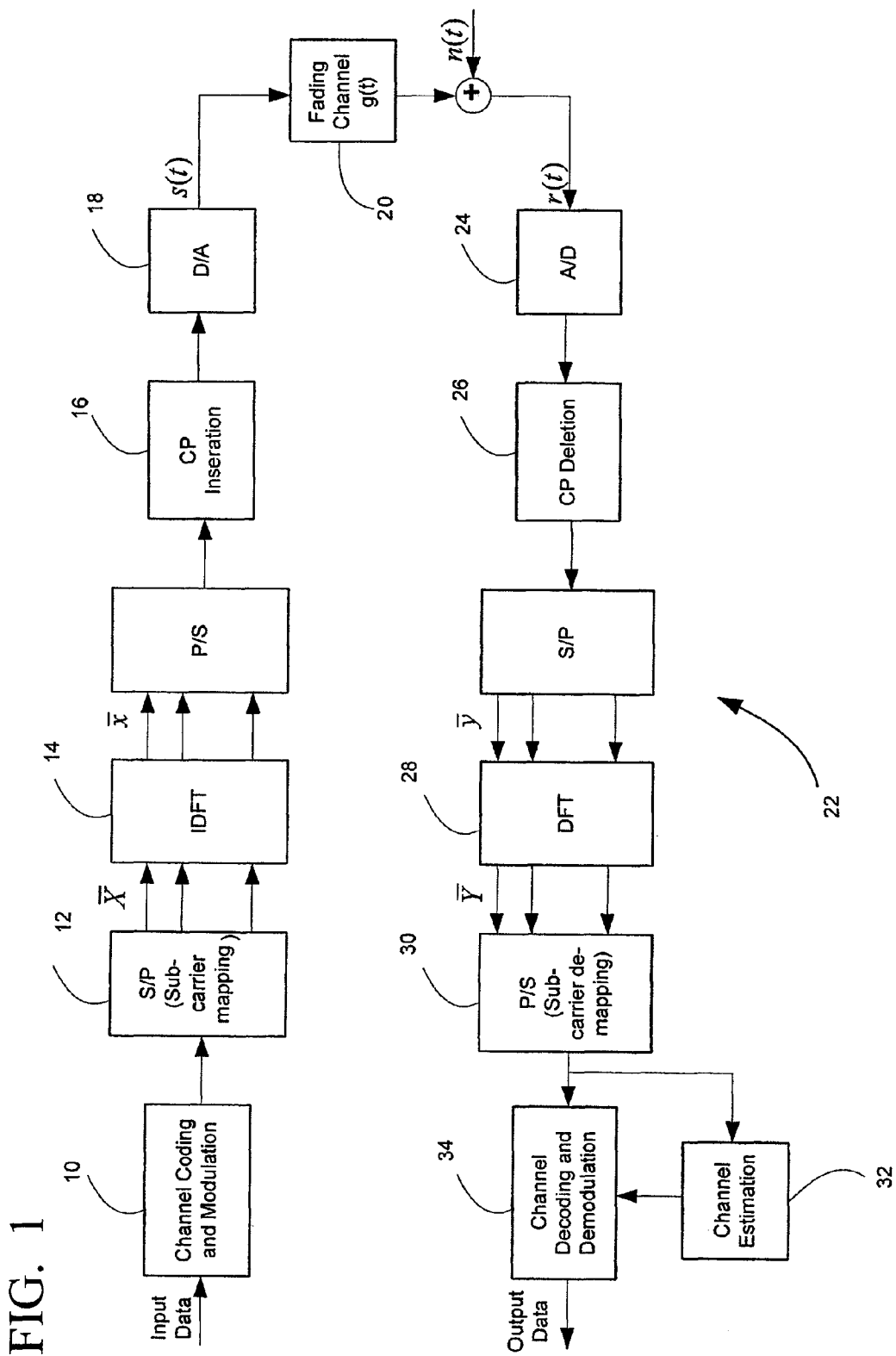
FIG. 1 is a schematic diagram depicting one embodiment of a digital implementation of a baseband OFDM communication system.
Figure 2:
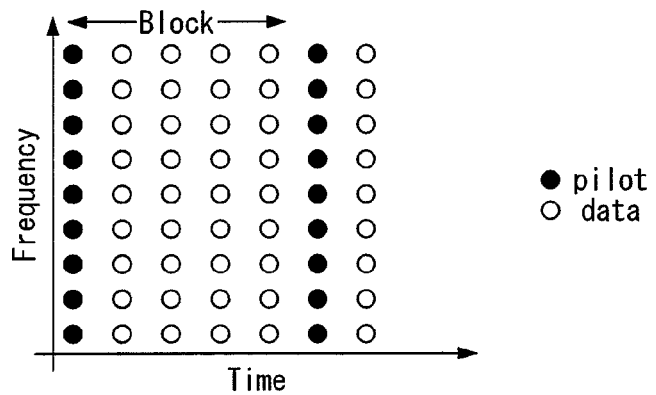
FIG. 2 is a graphical depiction of an exemplary pilot channel estimation technique used with the system of FIG. 1.
Figure 3:
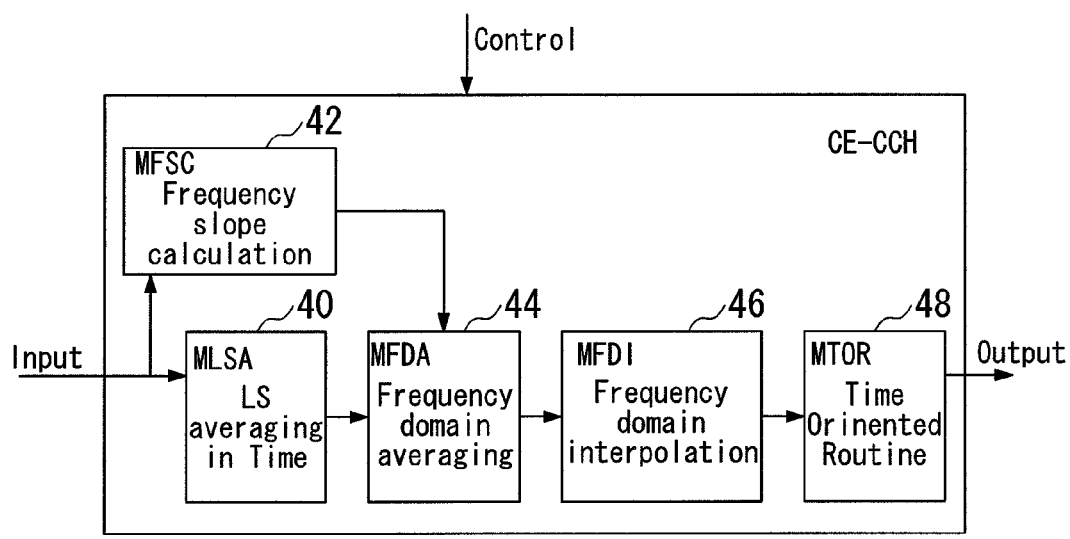
FIG. 3 is a schematic diagram of a series of data processing blocks for performing channel estimation in the system of FIG. 1.
Figure 4:
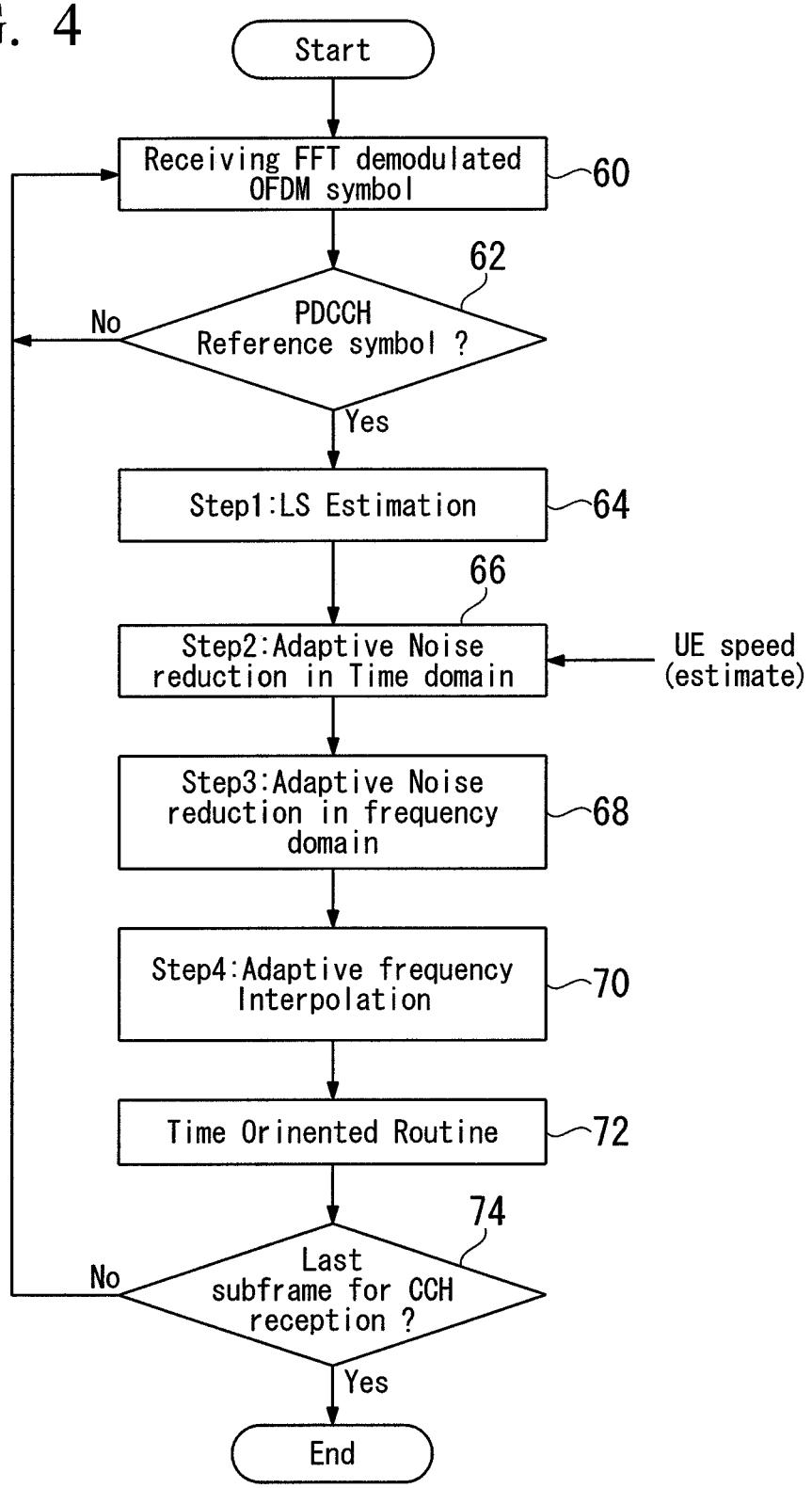
FIG. 4 is a flow chart depicting a sequence of operations performed by the series of data blocks shown in FIG. 3.

Referring now to FIG. 3, there is shown generally a series of data processing blocks 40, 42, 44, and 48 for performing channel estimation. These data processing blocks 40, 42, 44 and 48 form part of the channel decoding and demodulation block 32 in FIG. 1. The function of these data processing blocks will be explained with reference to FIG. 4.

At step 60, the channel decoding and demodulation block 32 receives a demodulated OFDM symbol. At step 62, the block 32 determines whether the received signal is a Physical Downlink Control Channel (PDCCH) symbol. If so, then at step 64 the block 32 performs LS estimation on the symbol.

At step 66, the MLSA data processing block 40 performs weighted averaging over time on input LS estimates generated by the block 32 in order to suppress noise. This can be expressed as:

$$H_{zf\_avg}(n,r,k)=(1-\alpha_1-\alpha_2)H_{zf}(n,r,k)+\alpha_1 H_{zf}(n-1,r,k)+\alpha_2 H_{zf}(n-2,r,k)$$

where $\alpha_1$ and $\alpha_2$ are selected based on:

the availability of previous LS estimates the UE speed (adaptive to the speed of receiver 22 or fixed values).

At step 68, the MFSC data processing block 42 calculates the frequency slope from the input LS estimates in order to estimate the frequency selectivity level of the mobile channel. (This information is used by the MFDA data processing block 44 to select the frequency domain averaging window length and/or coefficients, as will be described below. For example, large window length can be selected if the channel is flatter.)

The calculated frequency slope can be expressed as:

$$\hat{\eta}_{CCH} = \frac{1}{N_p - 1} \sum_{k=0}^{N_p-2} |H_{zf}(n, r = 0, k) - H_{zf}(n, r = 0, k+1)|^2$$

for $n$ even where $N_p$ is the number of pilot (or RS symbols) in a control OFDM symbol. The estimate of the slope can be improved by averaging over all Tx-Rx paths, if more than one Tx and/or Rx antennas are used.

Figure 5:
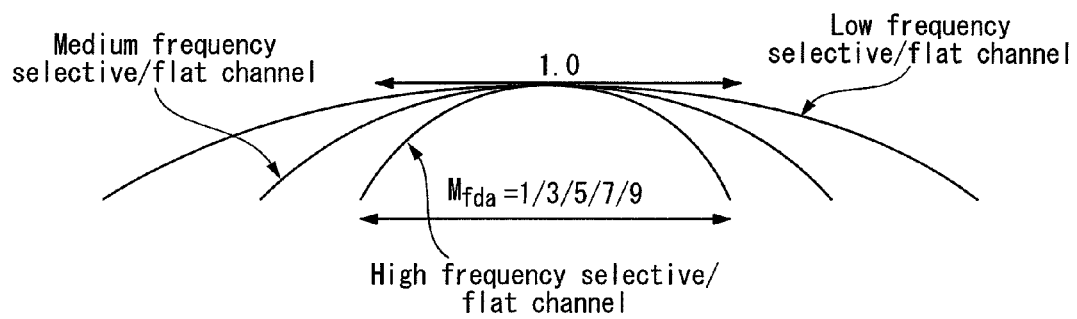
FIG. 5 is a graphical depiction of channel variation in frequency direction due to frequency selectivity of the channel, and the need for the adaptive window length used in a frequency domain averaging step carried out by one of the data processing blocks depicted in FIG. 3.

FIG. 5 depicts how frequency domain averaging coefficients are expected to change with frequency selectivity of the channel. Although more samples are beneficial in averaging out noise, the frequency selectivity of the channel will negatively impacts the resulting estimates from averaging. Therefore, proper number of samples is to be taken for averaging, depending on the nature of channel frequency selectivity.

The frequency domain averaging window length, and/or coefficients can be selected by comparing the calculated frequency slope threshold against one or more thresholds, and can be expressed as:

If $\hat{\eta}_{CCH} < \eta_{CCH\_th\_1} \rightarrow$ Low frequency selective channel Select $M_{fda}=M_{fda\_1}$ and $W_{fda}(n)=W_{fda\_1}(n)$ If $SNR_{est} < SNR_{CCH\_TH}$ $W_{CCH}=W_{CCH\_11}$ Else $W_{CCH}=W_{CCH\_12}$ Exit Else if $\hat{\eta}_{CCH} < \eta_{CCH\_th\_2} \rightarrow$ Medium frequency selective channel Select $M_{fda}=M_{fda\_2}$ and $W_{fda}(n)=W_{fda\_2}(n)$ If $SNR_{est} < SNR_{CCH\_TH}$ $W_{CCH}=W_{CCH\_21}$ Else $W_{CCH}=W_{CCH\_22}$ Exit Else $\rightarrow$ High frequency selective channel Select $M_{fda}=M_{fda\_3}$ and $W_{fda}(n)=W_{fda\_3}(n)$ If $SNR_{est} < SNR_{CCH\_TH}$ $W_{CCH}=W_{CCH\_31}$ Else $W_{CCH}=W_{CCH\_32}$ Exit Exit The values for $\eta_{CCH\_th\_1} < \eta_{CCH\_th\_2}$, $M_{fda\_1} > M_{fda\_2} < M_{fda\_3}$ and $W_{fda\_1}(n)$, $W_{fda\_2}(n)$, and $W_{fda\_3}(n)$, and $W_{CCH\_mn}$ for m=1, 2, 3; n=1, 2 are to be determined by simulations.

The MFDA data processing block 44 then performs frequency domain (FD) averaging on the input LS estimates using suitable averaging window length ($M_{fda}$) and coefficients ($W_{fda}(n)$ for n=0, 1, ..., $M_{fda}-1$), which are determined from frequency slope. The resulting frequency domain average $H_{zf\_ave}(k)$ is expressed as:

Case-I: Averaging at the beginning $$H_{zf\_ave}(k) = \frac{1}{M_1 + k + 2} \sum_{l=0}^{M_1+k+1} H_{zf}(l) W_{fda}(M_1 - k + l)$$

for $k < M_1$ and $M_1 = \left\lfloor \frac{M_{fda}}{2} \right\rfloor$

Case-II: Averaging in the middle $$H_{zf\_ave}(k) = \frac{1}{M+1} \sum_{l=0}^{M} H_{zf}(k - M_1 + l) W_{fda}(l) \text{ for}$$

Figure 6:
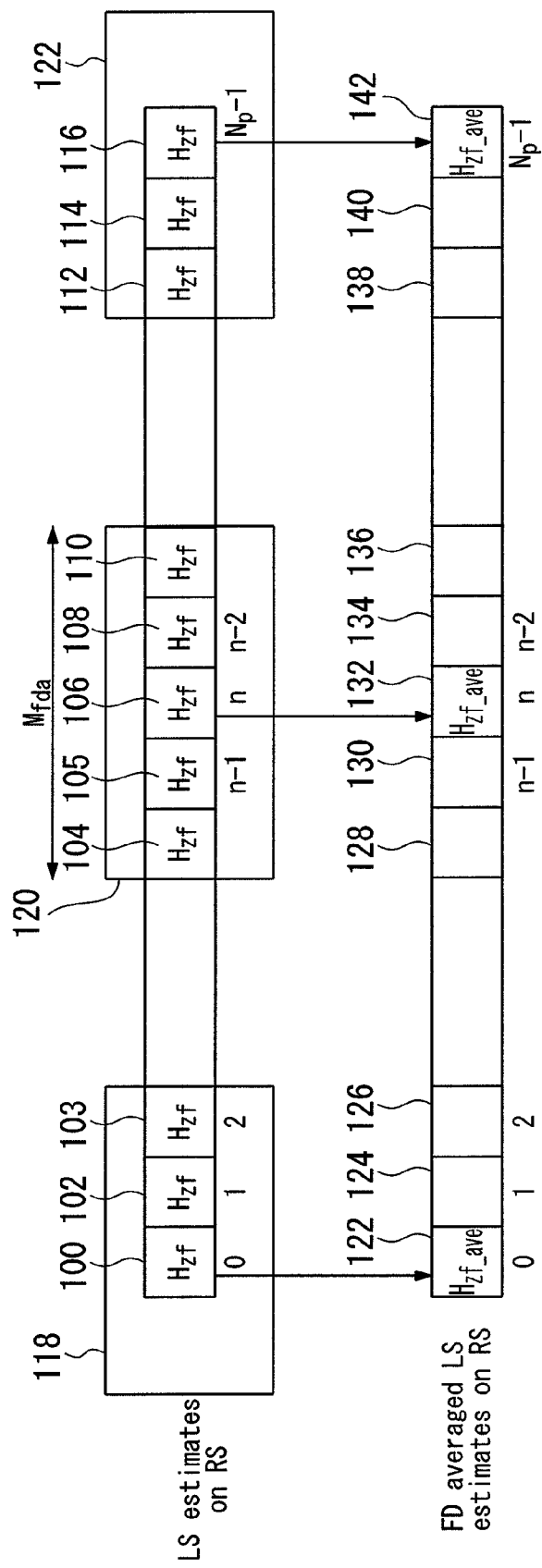
FIG. 6 is a schematic diagram depicting temporal relationships between input LS estimates, frequency domain averaged input LS estimates and windows used in their computation.

$M_1 \leq M_1 \leq k < N_p - 1 - M_1$ and $M_1 = \left\lfloor \frac{M_{fda}}{2} \right\rfloor$ Case-III: Averaging at the end $$H_{zf\_ave}(k) = \frac{1}{M_1 + N_p - k + 1} \sum_{l=0}^{M_1+N_p-k} H_{zf}(k - M_1 - l) W_{fda}(l)$$

for $N_p - 1 - M_1 \leq M < N_p - 1$ and $M_1 = \left\lfloor \frac{M_{fda}}{2} \right\rfloor$ FIG. 6 depicts a series of consecutively computed channel condition matrices 100 to 116 and exemplary frequency domain averaging windows 118 to 122 used to perform frequency domain averaging on the input LS estimates forming the channel condition matrices by the MFDA data processing block 44. This averaging process results in a series of consecutive frequency domain arranged channel condition matrices 122 to 142.

At step 70, the data processing block 46 then performs channel estimates on multiple (and preferably all) sub-carriers of pilot OFDM symbol from the frequency domain averaged samples by either linear interpolation/extrapolation or LMMSE interpolation. The interpolation can be implemented as matrix multiplication, and which type of interpolation used is transparent for implementation. The interpolation matrix is selected based on channel conditions, which are determined from frequency slope and SNR estimates.

To account for non-zero RS frequency offset, and to have simple LMMSE interpolation matrix, first linear extrapolation is performed to determine two band edge sample values from the FD averaged LS estimates.

Let newly defined FD averaged LS estimates as $H_1(k)$ for $0 \leq k \leq N_p+1$ where $H_1(k) = 2H_{zf\_ave}(0) - H_{zf\_ave}(1)$ for $k=0$ $H_1(k) = H_{zf\_ave}(k-1)$ for $k=1, \ldots, N_p$ $H_1(k) = 2H_{zf\_ave}(N_p-1) - H_{zf\_ave}(N_p-2)$ for $k=N_p+1$ Matrix interpolation can be performed on the newly constructed FD averaged LS estimates, and the resulting estimate is defined as:

$H_{int\,erp}(Mk) = H_1(k)$ for $k=0, \ldots, N_p+1$ $H_{int\,erp}(Mk+l) = W_{CCH}(1,0) H_1(k) + W_{CCH}(1,1) H_1(k+1)$
for $k=0, \ldots, N_p+1$ and $l=1, 2, \ldots, M-1$ where $W_{CCH}$ is an $(M-1) \times 2$ matrix, and M is RS spacing in frequency.

For linear interpolation, $W_{CCH}$ can be expressed as:

$$W_{CCH} = \begin{pmatrix} \frac{M-1}{M} & \frac{1}{M} \\ \frac{M-2}{M} & \frac{2}{M} \\ \vdots & \vdots \\ \frac{2}{M} & \frac{M-2}{M} \\ \frac{1}{M} & \frac{M-1}{M} \end{pmatrix}$$

For LMMSE interpolation, $W_{CCH}$ depends on SNR estimates, and frequency slope (i.e., theoretically delay spread), and can be selected out of 6 matrix as determined by MFDA module, ie., $W_{CCH} \in \{W_{CCH\_mn} \text{ for } m=1, 2, 3; n=1, 2\}$ At step 72, the MTOR data processing block 48 performs channel estimates on multiple (and preferably all sub-carriers of control channel OFDM symbol from the channel estimates of the pilot (i.e., RS) OFDM symbol by either of the following methods:
  (i) Assign control channel RS OFDM symbol channel estimates to all other control channel OFDM symbol channel estimate. This can be denoted as:
    $H_t = H_{int\,erp}$ where t is the index of the control channel OFDM symbol;
  (ii) Use linear interpolation/extrapolation in time direction with previous control channel RS OFDM symbol channel estimates.

Finally, at step 74, the channel demodulation and decoding block 32 determines if data from all CCH subframes have been processed and, if not, repeating steps 60 to 74 for the next subframe.

A number of embodiments of the invention have been described hereabove. Nevertheless, it will be understood that various modifications may be made without departing from the spirit and scope of the invention. Accordingly, other embodiments are to be understood as falling within the scope of the following claims.

INDUSTRIAL APPLICABILITY

The present invention can be applied generally to orthogonal frequency division modulation (OFDM) communication systems, and in particular to channel estimation of a control channel in such an OFDM system.

The invention claimed is:
1. A method of channel estimation for a control channel in an orthogonal frequency division modulation (OFDM) system, the method including the steps of:
  performing weighted averaging over time of input least square (LS) estimates of a plurality of channel condition matrices;

performing frequency domain averaging on the input LS estimates using a frequency domain averaging window having a length and/or coefficients determined by a frequency slope from the input LS estimates;

performing channel estimates on multiple subcarriers of pilot OFDM symbols from the frequency domain averaged input LS estimates;

performing channel estimates on multiple subcarriers of OFDM symbols in the control channel from the channel estimates on the subcarriers of pilot OFDM symbols;

comparing the frequency slope to one or more thresholds;

determining an estimated frequency selectivity of the control channel; and using the estimated frequency selectivity to determine the frequency domain averaging window length and/or coefficients.

2. The method according to claim 1, wherein the step of performing channel estimates on multiple subcarriers of pilot OFDM symbols from the frequency domain are performed by linear interpolation/extrapolation or linear minimum mean square error (LMMSE) interpolation.

3. The method according to claim 2, wherein the interpolation is implemented by matrix multiplication.

4. The method according to claim 1, wherein the step of performing channel estimates on multiple subcarriers of OFDM symbols in the control channel are performed by assigning control channel reference signal (RS) OFDM symbol channel estimates to all other control channel OFDM symbol channel estimates.

5. The method according to claim 1, wherein the step of performing channel estimates on multiple subcarriers of OFDM symbols in the control channel are performed by using linear interpolation/extrapolation with previous control channel RS OFDM symbol channel estimates.

6. A communications device which performs channel estimation for a control channel in an OFDM system, the device including one or more data processing blocks for:

performing weighted averaging over time of input LS estimates of a plurality of channel condition matrices;

performing frequency domain averaging on the input LS estimates using a frequency domain averaging window having a length and/or coefficients determined by a frequency slope from the input LS estimates;

performing channel estimates on multiple subcarriers of pilot OFDM symbols from the frequency domain averaged input LS estimates;

performing channel estimates on multiple subcarriers of OFDM symbols in the control channel from the channel estimates on the subcarriers of pilot OFDM symbols;

comparing the frequency slope to one or more thresholds;

determining an estimated frequency selectivity of the control channel; and using the estimated frequency selectivity to determine the frequency domain averaging window length and/or coefficients.

7. The method according to claim 1, wherein the step of performing channel estimates on multiple subcarriers of pilot OFDM symbols from the frequency domain are performed by linear interpolation/extrapolation or LMMSE interpolation.

8. The method according to claim 1, wherein the step of performing channel estimates on multiple subcarriers of OFDM symbols in the control channel are performed by assigning control channel RS OFDM symbol channel estimates to all other control channel OFDM symbol channel estimates.

9. The method according to claim 2, wherein the step of performing channel estimates on multiple subcarriers of OFDM symbols in the control channel are performed by assigning control channel RS OFDM symbol channel estimates to all other control channel OFDM symbol channel estimates.

10. The method according to claim 3, wherein the step of performing channel estimates on multiple subcarriers of OFDM symbols in the control channel are performed by assigning control channel RS OFDM symbol channel estimates to all other control channel OFDM symbol channel estimates.

11. The method according to claim 1, wherein the step of performing channel estimates on multiple subcarriers of OFDM symbols in the control channel are performed by using linear interpolation/extrapolation with previous control channel RS OFDM symbol channel estimates.

12. The method according to claim 2, wherein the step of performing channel estimates on multiple subcarriers of OFDM symbols in the control channel are performed by using linear interpolation/extrapolation with previous control channel RS OFDM symbol channel estimates.

13. The method according to claim 3, wherein the step of performing channel estimates on multiple subcarriers of OFDM symbols in the control channel are performed by using linear interpolation/extrapolation with previous control channel RS OFDM symbol channel estimates.

14. The method according to claim 4, wherein the step of performing channel estimates on multiple subcarriers of OFDM symbols in the control channel are performed by using linear interpolation/extrapolation with previous control channel RS OFDM symbol channel estimates.

* * * * *

UNITED STATES PATENT AND TRADEMARK OFFICE
CERTIFICATE OF CORRECTION

PATENT NO.        : 8,705,643 B2
APPLICATION NO. : 13/254292
DATED             : April 22, 2014
INVENTOR(S)       : Sathananthan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 91 days.

Signed and Sealed this
Twenty-ninth Day of September, 2015

Michelle K. Lee
*Director of the United States Patent and Trademark Office*